(12) United States Patent
Lee et al.

(10) Patent No.: US 10,866,676 B2
(45) Date of Patent: Dec. 15, 2020

(54) TOUCH SENSITIVE ELECTRONIC DEVICE, TOUCH SENSITIVE PROCESSING APPARATUS AND METHOD THEREOF

(71) Applicant: EGALAX_EMPIA TECHNOLOGY INC., Taipei (TW)

(72) Inventors: Cheng-Han Lee, Taipei (TW); Chi-Hao Tang, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 0 days.

(21) Appl. No.: 15/708,300

(22) Filed: Sep. 19, 2017

(65) Prior Publication Data

US 2018/0081488 A1  Mar. 22, 2018

(30) Foreign Application Priority Data

Sep. 19, 2016 (TW) .............................. 105130262 A

(51) Int. Cl.
| | | |
|---|---|---|
| G06F 3/041 | (2006.01) | |
| G06F 3/044 | (2006.01) | |
| G06F 3/045 | (2006.01) | |
| G09G 3/20 | (2006.01) | |

(52) U.S. Cl.
CPC ............ *G06F 3/0416* (2013.01); *G06F 3/044* (2013.01); *G06F 3/045* (2013.01); *G09G 3/2092* (2013.01); *G09G 2330/021* (2013.01)

(58) Field of Classification Search
CPC ........ G06F 3/0416; G06F 3/044; G06F 3/945; G09G 2330/021; G09G 3/2092
See application file for complete search history.

(56) References Cited

U.S. PATENT DOCUMENTS

| | | | |
|---|---|---|---|
| 8,169,411 B2 | 5/2012 | Park et al. | |
| 9,024,892 B2 | 5/2015 | Ting et al. | |
| 9,207,742 B2 | 12/2015 | Lin | |
| 2007/0273665 A1* | 11/2007 | Park | G06F 3/0416 345/173 |
| 2007/0290630 A1* | 12/2007 | Kim | H05B 37/0227 315/308 |
| 2010/0079444 A1* | 4/2010 | Kyriazis | G06T 3/4092 345/418 |
| 2013/0346641 A1* | 12/2013 | Corlett | G06F 13/10 710/18 |
| 2016/0109996 A1* | 4/2016 | Ye | G02F 1/13306 345/173 |
| 2016/0231848 A1* | 8/2016 | Lin | G06F 3/0416 |

FOREIGN PATENT DOCUMENTS

| | | |
|---|---|---|
| CN | 103970253 | 7/2016 |
| TW | 200743986 | 12/2007 |
| TW | 201128367 | 8/2011 |
| TW | 201344552 | 11/2013 |

* cited by examiner

*Primary Examiner* — Alexander Eisen
*Assistant Examiner* — Kebede T Teshome
(74) *Attorney, Agent, or Firm* — WPAT, PC

(57) ABSTRACT

A touch sensitive processing apparatus comprises a touch sensitive interface for connecting electrodes of a touch screen to detect a proximity/touch event; a host interface for reporting the proximity/touch event; a halt interface; and an embedded processor configured for commanding the touch sensitive interface to cease detecting proximity/touch events and the host interface to cease reporting proximity/touch events if the halt interface is set in a first logic state.

8 Claims, 3 Drawing Sheets

TOUCH SENSITIVE ELECTRONIC DEVICE, TOUCH SENSITIVE PROCESSING APPARATUS AND METHOD THEREOF

CROSS REFERENCES TO RELATED APPLICATIONS

The present application claims the benefit of Taiwan patent application, No. 105130262, filed on Sep. 19, 2016.

FIELD OF THE INVENTION

The present application is related to touch sensitive detection, and more particularly, to a technique that avoids or reduces the detection and reporting of undesirable proximity/touch events.

BACKGROUND OF THE INVENTION

Touch panels and touch screens are the main input/output (I/O) devices for modern consumer electronics devices. Modern electronic devices require energy saving. When an electronic device is not in use, various internal components enter into a power-saving mode or a sleep mode wherever possible. For example, a laptop computer usually has two parts, the upper half is a touch screen and the lower half usually contains a keyboard, a touch panel, and other major electronic components, such as a processor, a motherboard, a hard drive, a battery, and other components. When the lid of the laptop computer is closed, the upper and the lower halves are in proximity to each other or even come into contact with each other. If the touch panel and the touch screen did not deactivate their touch detection functions quickly enough, when the touch screen at the upper half is inadvertently touched by some protruding parts of the keyboard, for example, the touch screen may return unwanted touch events and may also be subject to interference from other electronic components, and the touch panel at the lower half may also be subject to interference from the touch screen at the upper half.

In addition, a user using a smartphone or a tablet PC without a protective lid may put the device into a pocket or a bag when the touch screen is in a sleep mode. Although the associated touch sensitive processing apparatus may also enter into a power-saving mode during this time, the touch sensitive processing apparatus may still wake up periodically to perform touch sensitive detection, and may be subject to interference from other things in the pocket or the bag.

When such interference occurs, the touch sensitive processing apparatus may mistakenly decide that the touch panel or touch screen is being touched by the user or an external conductive object. The touch sensitive processing apparatus then reports this proximity or touch event (also called proximity/touch event hereinafter) to a main processor and an operating system of the electronic device through a hardware or software interrupt. As a result of this, the main processor and the operating system may mistakenly think that the user is trying to wake up the electronic device through this proximity/touch event. Further, after the electronic device is woken up by the proximity/touch event, the touch sensitive processing apparatus that has returned to a normal operating mode may receive more unwanted inputs from the interference described above, resulting in more unwanted proximity/touch events being reported to the operating system and the corresponding application programs. This may lead to many undesirable outcomes.

Therefore, there is a need for a mechanism to avoid reporting of unwanted proximity/touch events caused by the above interference to prevent the proximity/touch events from causing the electronic device to execute instructions that may otherwise lead to undesirable outcomes.

SUMMARY OF THE INVENTION

In accordance with an embodiment of the present invention, a touch sensitive processing apparatus is provided, which may include: a touch sensitive interface for connecting with a plurality of electrodes of a touch screen to detect a proximity or touch event; a host interface for connecting with a host to report the proximity or touch event; a halt interface; and an embedded processor configured for commanding the touch sensitive interface to cease detecting the proximity or touch event and the host interface to cease reporting the proximity or touch event if the halt interface is set in a first logic state.

In accordance with an embodiment of the present invention, a touch sensitive processing method applicable to a touch sensitive processing apparatus is provided, the method may include the following steps: receiving the state of a halt interface; and commanding a touch sensitive interface of the touch sensitive processing apparatus to cease detecting any proximity or touch events and a host interface of the touch sensitive processing apparatus to cease reporting the proximity or touch events when the halt interface is set to a first logic state.

In accordance with an embodiment of the present invention, a touch sensitive electronic device is provided, which may include: a host; a touch screen; and a touch sensitive processing apparatus. The touch sensitive processing apparatus may include: a touch sensitive interface for connecting with a plurality of electrodes of the touch screen to detect a proximity or touch event; a host interface for connecting with the host to report the proximity or touch event; a halt interface for connecting with the host; and an embedded processor configured for commanding the touch sensitive interface to cease detecting the proximity or touch event and the host interface to cease reporting the proximity or touch event if the halt interface is set in a first logic state.

In accordance with an embodiment of the present invention, a touch sensitive electronic device is provided, which may include: a halt switch; a host; a touch screen; and a touch sensitive processing apparatus. The touch sensitive processing apparatus may include: a touch sensitive interface for connecting with a plurality of electrodes of the touch screen to detect a proximity or touch event; a host interface for connecting with the host to report the proximity or touch event; a halt interface for connecting with the halt switch; and an embedded processor configured for commanding the touch sensitive interface to cease detecting the proximity or touch event and the host interface to cease reporting the proximity or touch event if the halt interface is set in a first logic state.

The touch sensitive electronic device, the touch sensitive processing apparatus and method thereof set forth in various embodiments of the present invention may cease detection and reporting of proximity/touch events using a halt interface. The halt interface is specifically configured to serve the objectives described above. Thus, it is capable of ceasing reporting of the undesirable proximity/touch events caused by the interference described earlier, which in turn prevents the electronic device from executing the wrong instructions that may otherwise lead to undesirable outcomes.

DETAILED DESCRIPTION OF THE EMBODIMENTS

The present invention is described by the following specific embodiments. However, in addition to those embodiments disclosed herein, the present invention can be widely applied to other embodiments. The scope of the present invention is not limited by these embodiments, but rather those set forth in the claims. In order to facilitate a clear description and for those skilled in the art to readily understand the contents of the present invention, some portions of the diagrams are not drawn to scale; ratios of some elements with respect to other elements are exaggerated; and some details that are not relevant to the present invention are omitted for conciseness of the diagrams.

Figure 1:
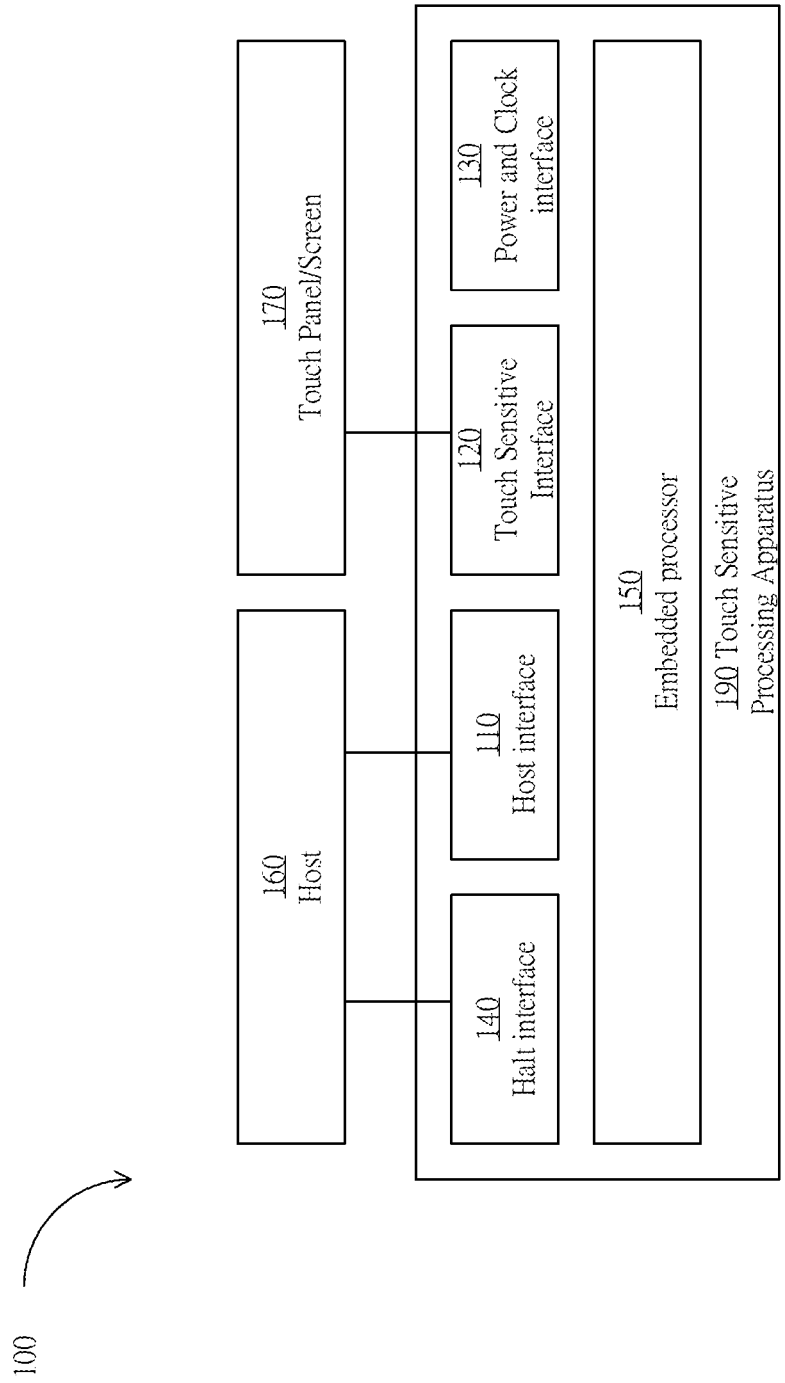
FIG. 1 is a block diagram depicting a touch sensitive electronic device in accordance with an embodiment of the present invention.

Referring to FIG. 1, a block diagram depicting a touch sensitive electronic device 100 in accordance with an embodiment of the present invention is shown. The touch sensitive electronic device 100 can be a laptop computer as described earlier, a smartphone or a tablet computer, and includes a host 160, a touch panel or touch screen 170 (collectively referred to as touch screen hereinafter) and a touch sensitive processing apparatus 190. The host 160 can be a x86 or x64 architecture computer available from Intel Corp. or an application program processor with ARM instruction sets available from Qualcomm Inc., and it is applicable to the aforementioned laptop computer, smartphone or tablet PC.

The touch sensitive processing apparatus 190 may include an embedded processor 150 for executing various software or firmware in order to detect a proximity/touch event on the touch screen 170 and report the proximity/touch event back to the host 160. The touch sensitive processing apparatus 190 can be an integrated circuit with a single packaging containing one or more dies or it may consist of integrated circuits of a plurality of packaging. The integrated circuit(s) of the touch sensitive processing apparatus 190 can be implemented in various types of packaging, such as a ball grid array (BGA), a land grid array (LGA), a quad flat package (QFP) and the like.

The touch sensitive processing apparatus 190 includes a power and clock interface 130 for obtaining power and clock signals necessary for operations from a power supply and a clock generator, respectively. The power and clock interface 130 may include one or more sets of power and ground lines, and one or more clock signal receiving lines. The touch sensitive processing apparatus 190 includes a touch sensitive interface 120 for connecting with various touch sensitive electrodes or conductive strips of the touch screen 170. The embedded processor 150 may perform a self-capacitive, a mutual capacitive or a resistive touch sensitive detection method for detecting an external conductive object (e.g. a finger) or an active/passive stylus.

The touch sensitive processing apparatus 190 includes a host interface 110 for connecting with the host 160. In some embodiments, the host interface 110 may include a standard industrial interface, such as USB, I$^2$C, IEEE 1394, PCI, PCI-Express, SCSI, SATA, or the like. The host interface 110 may include a self-defined proprietary interface. The host 160 uses the host interface 110 to issue configuration commands to the touch sensitive processing apparatus 190, for example, commands for starting or ceasing touch sensitive detection; for starting or ceasing reporting of proximity/touch events; and the like.

In an embodiment of the present invention, when the host 160 has detected the lid of the laptop computer is closed, or a user has turned off the touch screen 170, the host 160 may issue commands to the touch sensitive processing apparatus 190 via the host interface 110 to cease touch sensitive detection and the reporting of any proximity/touch events. When receiving the command for ceasing touch sensitive detection, the embedded processor 150 may cease the operations of the touch sensitive interface 120 to prevent the touch sensitive interface 120 from sending out a drive signal via the electrodes on the touch screen 170 that may otherwise interfere with other components. When receiving the command for ceasing reporting of any proximity/touch events, the embedded processor 150 may stop reporting any proximity/touch events to the host 160 via the host interface 110.

However, in the above embodiment, it is cumbersome to issue commands from the host 160 to the touch sensitive processing apparatus 190 via the host interface 110 in that commands are relayed through different components such as the operating system, a driver, a hardware interface and the like, and there may be a lot of touch events that require processing after the user has closed the lid of the laptop computer or turned off the touch screen 170. When the delivery of the commands for ceasing the touch sensitive detection and the reporting of any proximity/touch events is too slow, then reporting of an unwanted proximity/touch event may still occur after the laptop computer is closed or the touch screen 170 is turned off.

Therefore, in another embodiment of the present invention, the touch sensitive processing apparatus 190 includes a halt interface 140 for quickly ceasing touch sensitive detection and reporting of any proximity/touch events. The host 160 may issue these two commands without using the aforementioned host interface 110, but directly via the halt interface 140 to command the touch sensitive processing apparatus 190 to cease touch sensitive detection and reporting of any proximity/touch events.

The halt interface 140 can be a one-pin digital input interface. When the host 160 sets the halt interface 140 in a first logic state, for example, voltage is pulled high, then the touch sensitive processing apparatus 190 ceases to perform touch sensitive detection and ceases to report any proximity/touch events. When the host 160 sets the halt interface 140 in a second logic state, for example, the voltage is pulled low, then the touch sensitive processing apparatus 190 starts to perform touch sensitive detection and start to report proximity/touch events.

In an embodiment, the touch sensitive processing apparatus 190 may also be in one of a normal operating state and a power-saving state. When the touch sensitive processing apparatus 190 is in the normal operating state, and the halt interface 140 is set to the second logic state, then the touch sensitive processing apparatus 190 starts to perform touch sensitive detection and report any proximity/touch events using a normal operating frequency. When the touch sensitive processing apparatus 190 is in the power-saving state, and the halt interface 140 is set to the second logic state, then the touch sensitive processing apparatus 190 starts to perform touch sensitive detection and report any proximity/touch events using a lower operating frequency. For example, under the normal operating state, the touch sensitive processing apparatus 190 may perform touch sensitive detection and reporting of proximity/touch events 60 to 100 times per second; under the power-saving state, the touch sensitive processing apparatus 190 may perform touch sensitive detection and reporting of proximity/touch events once every 3 seconds. When no touch sensitive detection or reporting of proximity/touch events is performed, the touch sensitive processing apparatus 190 may turn off related components to save power.

In the embodiment above, the host 160 is still needed to use the halt interface 140 to issue commands to the touch sensitive processing apparatus 190. If the loading of the host 160 is too heavy or the processing speed is too slow at the time, then reporting of an unwanted proximity/touch event may still occur after the laptop computer is closed or the touch screen 170 is turned off.

Figure 2:
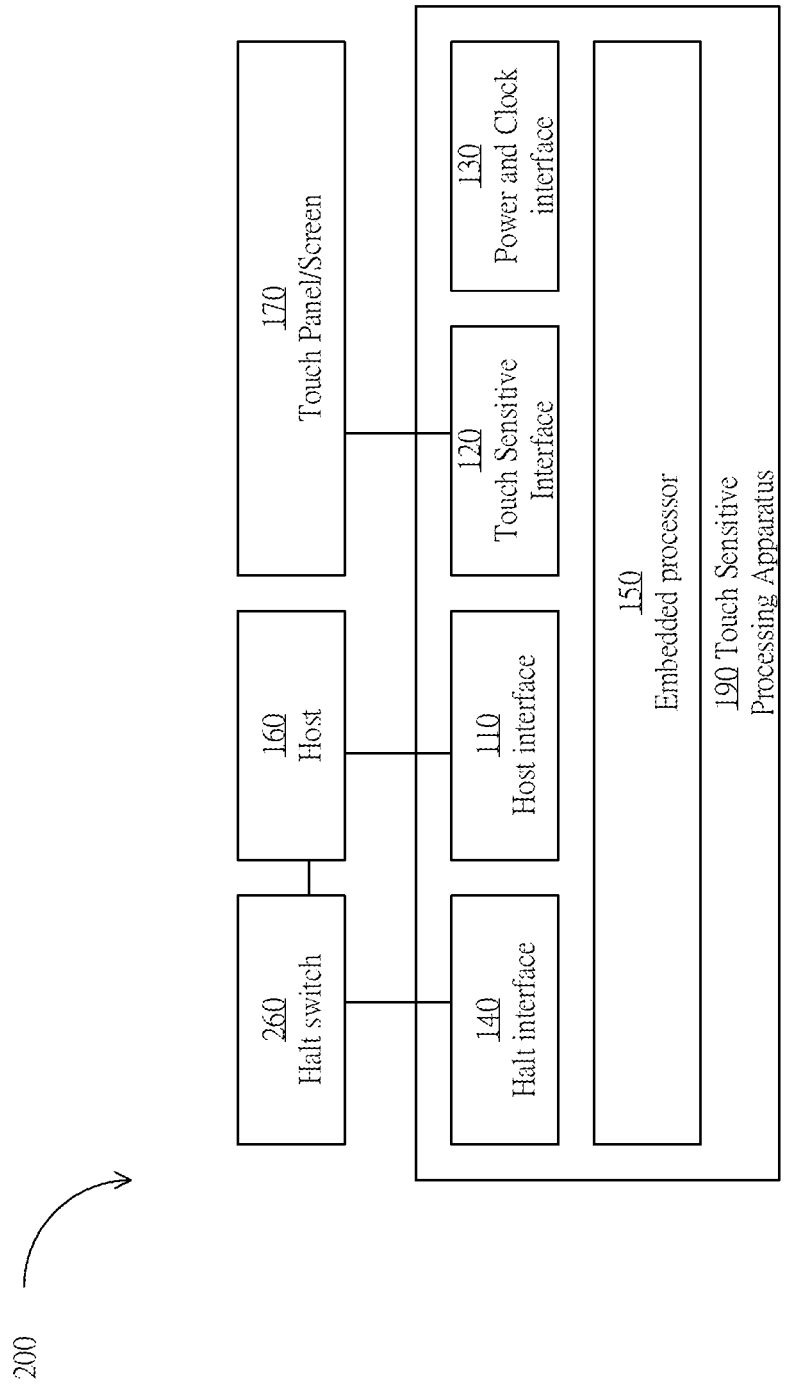
FIG. 2 is a block diagram depicting a touch sensitive electronic device in accordance with another embodiment of the present invention.

Referring to FIG. 2, a block diagram depicting a touch sensitive electronic device 200 in accordance with another embodiment of the present invention is shown. The difference between the embodiments of FIG. 2 and FIG. 1 is that a halt switch 260 is provided. The halt switch 260 may be a switch for detecting whether the laptop computer is closed, and may be a mechanical switch, an optical sensitive switch, a circuit switch, or the like. The halt switch 260 may also be a button on a smartphone, for example.

When the halt switch 260 has detected the lid of the laptop computer is closed, or the touch screen of the smartphone is turned off by the user pressing the button, then the halt interface 140 is directly placed in the first logic state, and the touch sensitive processing apparatus 190 ceases to perform touch sensitive detection and reporting of proximity/touch events. When the halt switch 260 has detected that the previously closed laptop computer is opened, or the touch screen of the smartphone is woken up by the user pressing the button, then the halt interface 140 is directly placed in the second logic state, and the touch sensitive processing apparatus 190 starts to perform touch sensitive detection and reporting of proximity/touch events.

The halt switch 260 may further notify its detected state to the host 160, such that the host 160 may perform other triggered events. As a result, this saves the host 160 from having to handle touch-sensitive related tasks.

Figure 3:
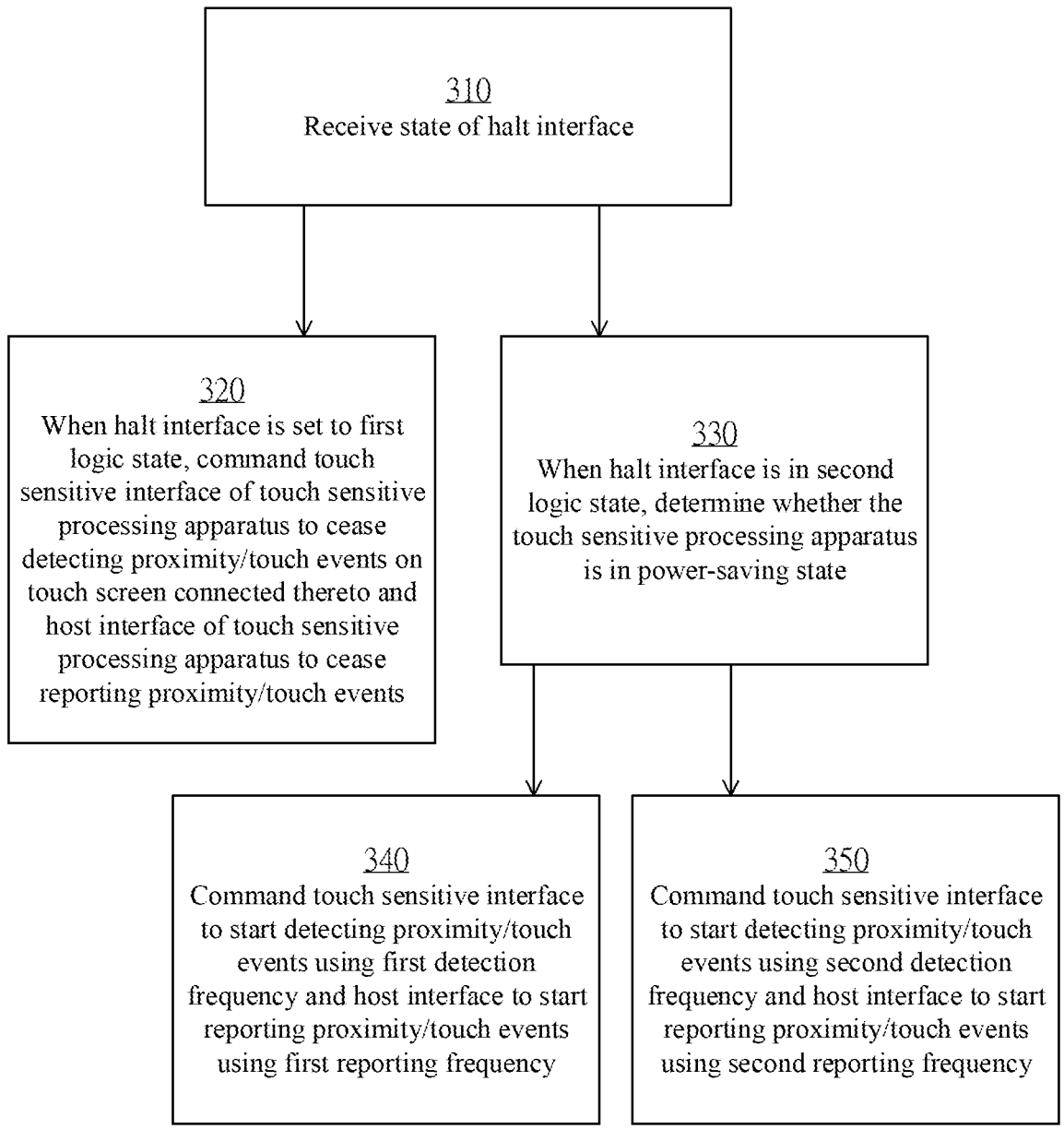
FIG. 3 is a flowchart illustrating a touch sensitive processing method in accordance with an embodiment of the present invention.

Referring to FIG. 3, a flowchart illustrating a touch sensitive processing method in accordance with an embodiment of the present invention is shown. The method is applicable to the touch sensitive processing apparatus shown in FIG. 1 or FIG. 2, for example. In step 310, the state of a halt interface is received. The direction of the flow of the method depends on this state. When the state is a first logic state, proceed to step 320. When the state is a second logic state, proceed to step 330.

In step 320, when the halt interface is set to the first logic state, a touch sensitive interface of the touch sensitive processing apparatus is commanded to cease detecting any proximity/touch events on a touch screen connected thereto and a host interface of the touch sensitive processing apparatus is commanded to cease reporting any proximity/touch events, regardless of whether the touch sensitive processing apparatus is in a normal operating state or a power-saving state.

In step 330, when the halt interface is in the second logic state, it is determined whether the touch sensitive processing apparatus is in a power-saving state. If so, then proceed to step 350; else, proceed to step 340. Alternatively, in another embodiment, if the state the touch sensitive processing apparatus is in is not considered (whether in the normal operating state or the power-saving state), then when the halt interface is in the second logic state, the touch sensitive interface is commanded to start detecting proximity/touch events and the host interface is commanded to start reporting proximity/touch events.

In step 340, if the touch sensitive processing apparatus is not in the power-saving state, then the touch sensitive interface is commanded to start detecting proximity/touch events using a first detection frequency, and the host interface is commanded to start reporting proximity/touch events using a first reporting frequency. In step 350, if the touch sensitive processing apparatus is in the power-saving state, then the touch sensitive interface is commanded to start detecting proximity/touch events using a second detection frequency and the host interface is commanded to start reporting proximity/touch events using a second reporting frequency, wherein the first detection frequency is higher than the second detection frequency, and the first reporting frequency is higher than the second reporting frequency.

In accordance with an embodiment of the present invention, a touch sensitive processing apparatus is provided, which includes a touch sensitive interface for connecting with a plurality of electrodes of a touch screen in order to detect a proximity/touch event; a host interface for connecting with a host in order to report the proximity/touch event; a halt interface; and an embedded processor configured for commanding the touch sensitive interface to cease detecting proximity/touch events and the host interface to cease reporting proximity/touch events if the halt interface is set in a first logic state.

In order to commence the starting of detection and reporting of proximity/touch events, the embedded processor is configured for commanding the touch sensitive interface to start detecting proximity/touch events and the host interface to start reporting proximity/touch events if the halt interface is set in a second logic state.

In order to start detecting and reporting proximity/touch events under both a normal operating state and a power-saving state, the embedded processor is configured for determining whether the touch sensitive processing apparatus is in a power-saving state when the halt interface is set in a second logic state. If the touch sensitive processing apparatus is not in the power-saving state, then the touch sensitive interface is commanded to start detecting proximity/touch events using a first detection frequency and the host interface is commanded to start reporting proximity/touch events using a first reporting frequency. In step 350, if the touch sensitive processing apparatus is in the power-saving state, then the touch sensitive interface is commanded to start detecting proximity/touch events using a second detection frequency and the host interface is commanded to start reporting proximity/touch events using a second reporting frequency, wherein the first detection frequency is higher than the second detection frequency, and the first reporting frequency is higher than the second reporting frequency.

In accordance with an embodiment of the present invention, a touch sensitive processing method applicable to a touch sensitive processing apparatus is provided. The method includes receiving the state of a halt interface; and commanding a touch sensitive interface of the touch sensitive processing apparatus to cease detecting any proximity/touch events and a host interface of the touch sensitive processing apparatus to cease reporting any proximity/touch events when the halt interface is set to a first logic state.

In order to commence the starting of detection and reporting of proximity/touch events, the touch sensitive processing method further includes: commanding the touch sensitive interface to start detecting proximity/touch events and the host interface to start reporting proximity/touch events if the halt interface is set in a second logic state.

In order to start detecting and reporting proximity/touch events under both a normal operating state and a power-saving state, the touch sensitive processing method further includes: determining whether the touch sensitive processing apparatus is in a power-saving state when the halt interface is set in a second logic state; if the touch sensitive processing apparatus is not in the power-saving state, then the touch sensitive interface is commanded to start detecting proximity/touch events using a first detection frequency and the host interface is commanded to start reporting proximity/touch events using a first reporting frequency; and if the touch sensitive processing apparatus is in the power-saving state, then the touch sensitive interface is commanded to start detecting proximity/touch events using a second detection frequency and the host interface is commanded to start reporting proximity/touch events using a second reporting frequency, wherein the first detection frequency is higher than the second detection frequency, and the first reporting frequency is higher than the second reporting frequency.

In accordance with an embodiment of the present invention, a touch sensitive electronic device is provided, which includes: a host; a touch screen and a touch sensitive processing apparatus. The touch sensitive processing apparatus includes: a touch sensitive interface for connecting with a plurality of electrodes of the touch screen in order to detect a proximity/touch event; a host interface for connecting with the host in order to report the proximity/touch event; a halt interface; and an embedded processor configured for commanding the touch sensitive interface to cease detecting proximity/touch events and the host interface to cease reporting proximity/touch events if the halt interface is set in a first logic state.

In order to commence the starting of detection and reporting of proximity/touch events, the embedded processor is configured for commanding the touch sensitive interface to start detecting proximity/touch events and the host interface to start reporting proximity/touch events if the halt interface is set in a second logic state.

In order to start detecting and reporting proximity/touch events under both a normal operating state and a power-saving state, the embedded processor is configured for determining whether the touch sensitive processing apparatus is in a power-saving state when the halt interface is set in a second logic state. If the touch sensitive processing apparatus is not in the power-saving state, then the touch sensitive interface is commanded to start detecting proximity/touch events using a first detection frequency and the host interface is commanded to start reporting proximity/touch events using a first reporting frequency. In step 350, if the touch sensitive processing apparatus is in the power-saving state, then the touch sensitive interface is commanded to start detecting proximity/touch events using a second detection frequency and the host interface is commanded to start reporting proximity/touch events using a second reporting frequency, wherein the first detection frequency is higher than the second detection frequency, and the first reporting frequency is higher than the second reporting frequency.

In accordance with an embodiment of the present invention, a touch sensitive electronic device is provided, which includes: a halt switch; a host; a touch screen and a touch sensitive processing apparatus. The touch sensitive processing apparatus includes: a touch sensitive interface for connecting with a plurality of electrodes of the touch screen in order to detect a proximity/touch event; a host interface for connecting with the host in order to report the proximity/touch event; a halt interface for connecting with the halt switch; and an embedded processor configured for commanding the touch sensitive interface to cease detecting proximity/touch events and the host interface to cease reporting proximity/touch events if the halt interface is set in a first logic state.

In order to commence the starting of detection and reporting of proximity/touch events, the embedded processor is configured for commanding the touch sensitive interface to start detecting proximity/touch events and the host interface to start reporting proximity/touch events if the halt interface is set in a second logic state.

In order to start detecting and reporting proximity/touch events under both a normal operating state and a power-saving state, the embedded processor is configured for determining whether the touch sensitive processing apparatus is in a power-saving state when the halt interface is set in a second logic state. If the touch sensitive processing apparatus is not in the power-saving state, then the touch sensitive interface is commanded to start detecting proximity/touch events using a first detection frequency and the host interface is commanded to start reporting proximity/touch events using a first reporting frequency. In step 350, if the touch sensitive processing apparatus is in the power-saving state, then the touch sensitive interface is commanded to start detecting proximity/touch events using a second detection frequency and the host interface is commanded to start reporting proximity/touch events using a second reporting frequency, wherein the first detection frequency is higher than the second detection frequency, and the first reporting frequency is higher than the second reporting frequency.

The touch sensitive electronic device may be a laptop computer. In order to detect whether the lid of the laptop computer is closed or open, when the halt switch detects that the lid of the laptop computer is closed, then the halt interface is set to the first logic state; and when the halt switch detects that the lid of the laptop computer is open, then the halt interface is set to the second logic state.

In order to detect whether a touch screen of a smartphone or a tablet PC is turned on or off, when the halt switch detects that the touch screen is turned off, then the halt interface is set to the first logic state; and when the halt switch detects that touch screen is turned on, then the halt interface is set to the second logic state.

What is claimed is:

1. A touch sensitive processing apparatus comprising:
   a touch sensitive interface for connecting with a plurality of electrodes of a touch screen to detect a proximity or touch event;
   a host interface for connecting with a host to report the proximity or touch event;
   a halt interface for connecting with a halt switch, wherein the halt switch receives no command from the host, wherein the halt switch is one of a mechanical switch, an optical sensitive switch, a circuit switch, and a button, wherein the halt interface is not connected to the plurality of electrodes of the touch screen; and an embedded processor configured for commanding the touch sensitive interface to cease detecting the proximity or touch event and the host interface to cease reporting the proximity or touch event if the halt interface is set in a first logic state represented by a first voltage level, and for commanding the touch sensitive interface to start detecting the proximity or touch event and the host interface to start reporting the proximity or touch event if the halt interface is set in a second logic state represented by a second voltage level.

2. The touch sensitive processing apparatus of claim 1, wherein when the halt interface is set in the second logic state represented by the second voltage level, the embedded processor is configured for determining whether the touch sensitive processing apparatus is in a power-saving state, and if the touch sensitive processing apparatus is not in the power-saving state, then the touch sensitive interface is commanded to start detecting the proximity or touch event using a first detection frequency and the host interface is commanded to start reporting the proximity or touch event using a first reporting frequency; else if the touch sensitive processing apparatus is in the power-saving state, then the touch sensitive interface is commanded to start detecting the proximity or touch event using a second detection frequency and the host interface is commanded to start reporting the proximity or touch event using a second reporting frequency, wherein the first detection frequency is higher than the second detection frequency, and the first reporting frequency is higher than the second reporting frequency.

3. A touch sensitive processing method applicable to a touch sensitive processing apparatus, the method comprising:

receiving a state of a halt interface, which connects with a halt switch, wherein the halt switch receives no command from the host, wherein the halt switch is one of a mechanical switch, an optical sensitive switch, a circuit switch, and a button, wherein the halt interface is not connected to the plurality of electrodes of the touch screen;

commanding a touch sensitive interface of the touch sensitive processing apparatus to cease detecting any proximity or touch events and a host interface of the touch sensitive processing apparatus to cease reporting the proximity or touch events to the host when the halt interface is set to a first logic state represented by a first voltage level; and commanding the touch sensitive interface to start detecting the proximity or touch event and the host interface to start reporting the proximity or touch event if the halt interface is set in a second logic state represented by a second voltage level.

4. The touch sensitive processing method of claim 3, further comprising:

determining whether the touch sensitive processing apparatus is in a power-saving state when the halt interface is set in the second logic state represented by the second voltage level;

if the touch sensitive processing apparatus is not in the power-saving state, then commanding the touch sensitive interface to start detecting the proximity or touch event using a first detection frequency and the host interface to start reporting the proximity or touch event using a first reporting frequency; and if the touch sensitive processing apparatus is in the power-saving state, then commanding the touch sensitive interface to start detecting proximity or touch events using a second detection frequency and the host interface to start reporting proximity or touch events using a second reporting frequency, wherein the first detection frequency is higher than the second detection frequency, and the first reporting frequency is higher than the second reporting frequency.

5. A touch sensitive electronic device comprising:

a halt switch, wherein the halt switch is one of a mechanical switch, an optical sensitive switch, a circuit switch, and a button;

a host;

a touch screen; and a touch sensitive processing apparatus including:

a touch sensitive interface for connecting with a plurality of electrodes of the touch screen to detect a proximity or touch event;

a host interface for connecting with the host to report the proximity or touch event;

a halt interface for connecting with the halt switch, wherein the halt switch receives no command from the host, wherein the halt interface is not connected to the plurality of electrodes of the touch screen; and an embedded processor configured for commanding the touch sensitive interface to cease detecting the proximity or touch event and the host interface to cease reporting the proximity or touch event if the halt interface is set in a first logic state represented by a first voltage level, and for commanding the touch sensitive interface to start detecting the proximity or touch event and the host interface to start reporting the proximity or touch event if the halt interface is set in a second logic state represented by a second voltage level.

6. The touch sensitive electronic device of claim 5, wherein the embedded processor is configured for determining whether the touch sensitive processing apparatus is in a power-saving state when the halt interface is set in the second logic state represented by the second voltage level; if the touch sensitive processing apparatus is not in the power-saving state, then the touch sensitive interface is commanded to start detecting the proximity or touch event using a first detection frequency and the host interface is commanded to start reporting the proximity or touch event using a first reporting frequency; else if the touch sensitive processing apparatus is in the power-saving state, then the touch sensitive interface is commanded to start detecting the proximity or touch event using a second detection frequency and the host interface is commanded to start reporting the proximity or touch event using a second reporting frequency, wherein the first detection frequency is higher than the second detection frequency, and the first reporting frequency is higher than the second reporting frequency.

7. The touch sensitive electronic device of claim 5, wherein the touch sensitive electronic device is a laptop computer, and when the halt switch detects that a lid of the laptop computer is closed, then the halt interface is set to the first logic state represented by the first voltage level; and when the halt switch detects that the lid of the laptop computer is open, then the halt interface is set to the second logic state represented by the second voltage level.

8. The touch sensitive electronic device of claim 5, when the halt switch detects that the touch screen is turned off, then the halt interface is set to the first logic state represented by the first voltage level, and when the halt switch detects that touch screen is turned on, then the halt interface is set to the second logic state represented by the second voltage level.

\* \* \* \* \*